May 10, 1960 A. H. WARNIER 2,936,346
METHOD OF AMPLIFICATION OF DIRECT CURRENTS OR VOLTAGES
Filed Feb. 1, 1957 2 Sheets-Sheet 1

INVENTOR:
ALBERT H. WARNIER,
BY Michael Masnik
HIS ATTORNEY.

METHOD OF AMPLIFICATION OF DIRECT CURRENTS OR VOLTAGES

Filed Feb. 1, 1957 2 Sheets-Sheet 2

INVENTOR:
ALBERT H. WARNIER,
BY Michael Masnik
HIS ATTORNEY.

United States Patent Office 2,936,346
Patented May 10, 1960

2,936,346

METHOD OF AMPLIFICATION OF DIRECT CURRENTS OR VOLTAGES

Albert H. Warnier, Juvisy (Seine et Oise), France, assignor to Cie Francaise Thomson-Houston, Paris, France Application February 1, 1957, Serial No. 637,718

Claims priority, application France February 3, 1956

8 Claims. (Cl. 330—10)

Figure 4:
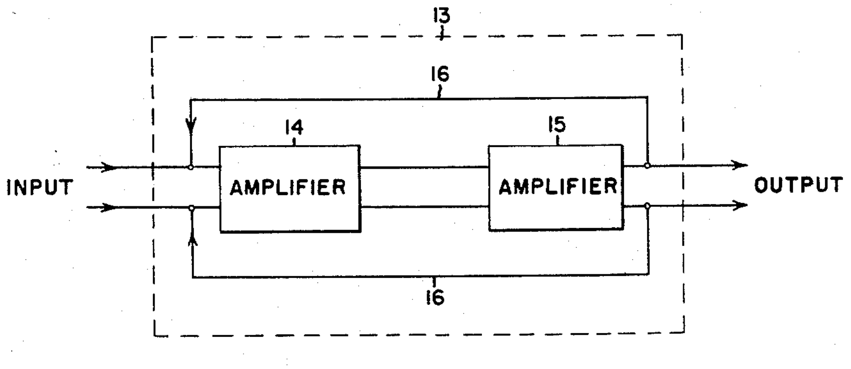

The present invention is concerned with a new method of amplification of electric currents or voltages which vary very slowly, for example at the rate of a few cycles per second.

In fields such as signal control, signal recording, signal regulation, etc., it is oftentimes desired to amplify electric signals of low frequency.

Where the frequency of these signals is very low, methods of amplification calling for directly-coupled amplifiers generally are used. The drawbacks of this type of amplifier are well known. The most troublesome is the drift which consists in a displacement of the zero balance of the amplifier due to the instability of supply voltages and various amplifier circuit components. The correction of drift becomes more difficult the higher the gain of the amplifier. A.-C. amplifiers generally do not present these difficulties. It has thus been proposed to convert the direct voltages into alternating voltages whose amplitude is made proportional to that of the direct voltages, to amplify the alternating voltages thus obtained, and finally to detect the amplified alternating voltage to provide an amplified direct voltage. These prior art approaches have proven unsatisfactory particularly where signals of small amplitude and changing polarity are involved.

It is therefore an object of my invention to provide an improved arrangement and method for amplifying direct or low frequency signals.

It is another object of my invention to provide an improved arrangement for amplifying direct voltages.

It is another object of my invention to provide an improved signal processing arrangement.

The features of the present invention which are believed to be novel are particularly pointed out in the appended claims.

Figure 5:
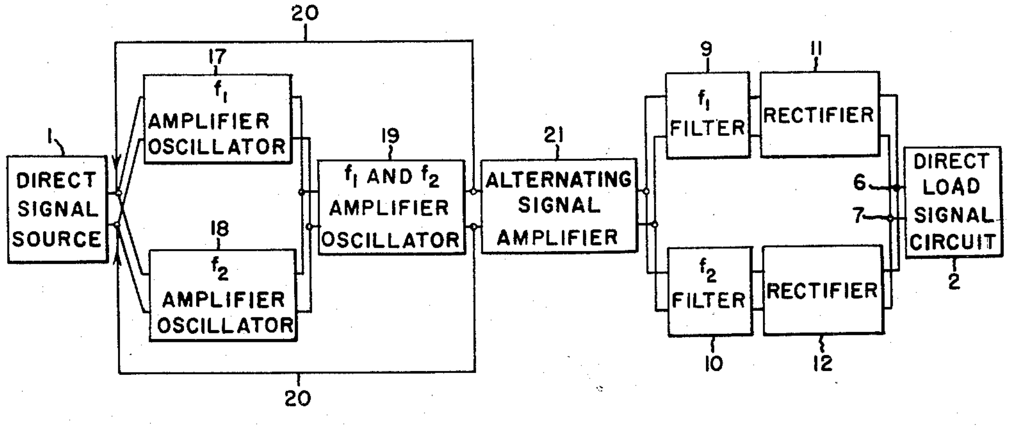
Figure 1:
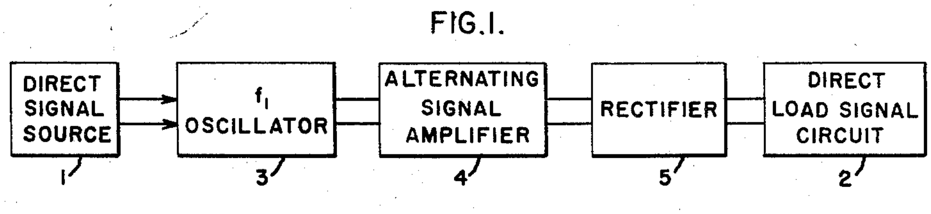
Figure 2:
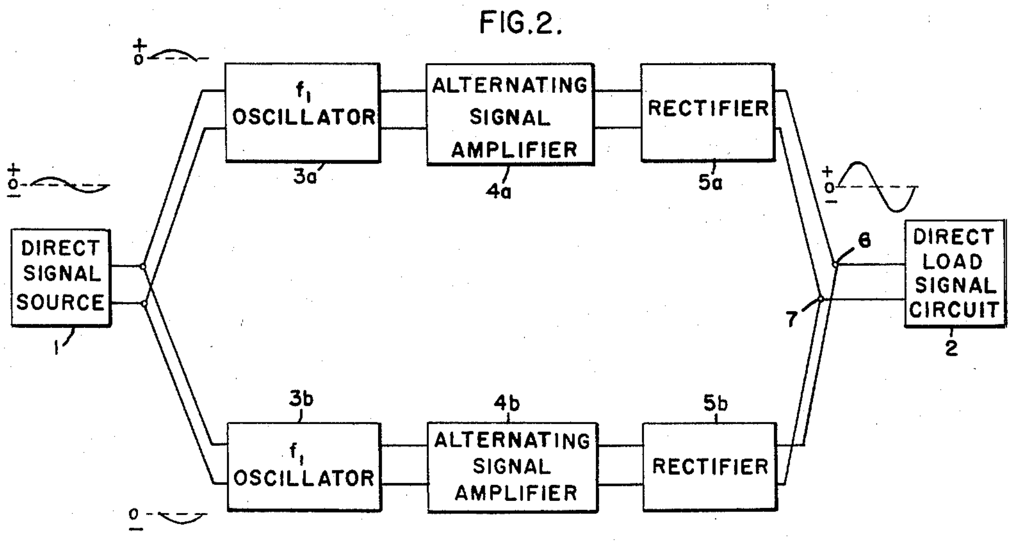
Figure 3:
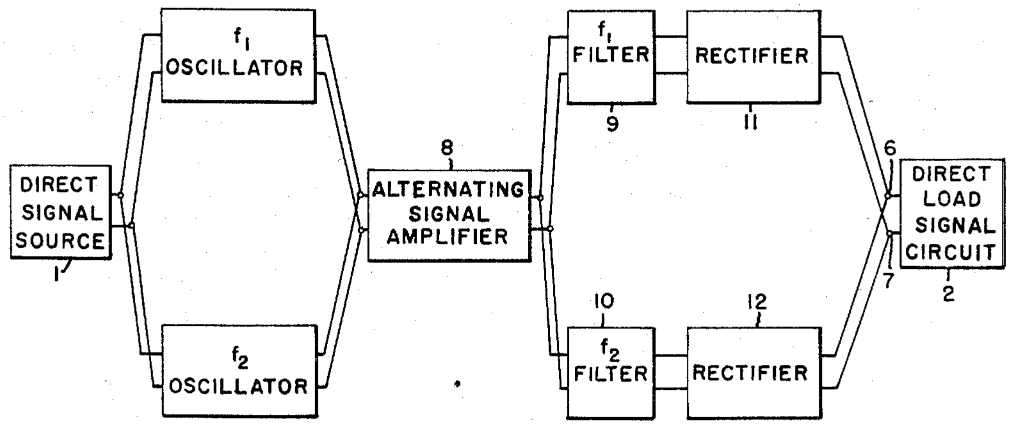

In the drawings,

Fig. 1 illustrates a prior art arrangement, Fig. 2 illustrates one embodiment of the present invention, Fig. 3 illustrates a further embodiment of the invention, Fig. 4 illustrates a feedback oscillator arrangement useful in a further embodiment of the invention, and Fig. 5 illustrates a preferred application of the arrangement 4.

Referring to Fig. 1, there is shown a prior art arrangement for amplifying direct current signals from a source 1 before application to a load circuit 2. Oscillator 3 delivers oscillations of frequency $f_1$ to amplifier 4 whose amplitude of oscillations is varied in accordance with the amplitude of signals available from source 1. After further amplification in amplifier 4, the alternating signals, of amplitude corresponding to that of the signals available from 1, are detected in detector 5 and applied to the load circuit 2.

The circuit of Fig. 1 does not permit a simple amplification of variable voltages which may change sign and whose direction has to be maintained. Circuits are required to restore the original reference level for the two voltage polarities. The purpose of this invention is, on the one hand, to eliminate the above difficulties and, on the other hand, to reduce the threshold of the direct voltage above which the oscillator begins to function. According to the first characteristic of the invention, the control voltage V is used to feed two controlled amplitude oscillators *3a* and *3b* in parallel, responding to opposite polarities as shown by waveforms $V_1$ and $V_2$ respectively.

In this way, by suitable voltage control of the oscillators *3a* and *3b*, the voltages of the same polarity cause one of the oscillators to oscillate while the other becomes inoperative.

If the signal voltage changes direction, the oscillation status of the two oscillators is reversed. It must be understood that the operation of the two oscillators is so regulated that one acts for a certain polarity of the control voltage, for example, input voltage excursions between 0 and +V volts, while the other one is at rest and vice versa for input voltage excursions between 0 and —V volts.

In the first example, each oscillator *3a* or *3b* is followed by an A.-C. amplifier such as *4a* and *4b* and a detector such as *5a* and *5b*. The detectors are so connected, that is polarized, such that the polarity of the control voltage is re-established at the output leads 6 and 7. The detectors, which may comprise well-known diode circuit arrangements, are biased such that the desired or original reference level for the two voltage polarities is restored at the output leads 6 and 7.

According to a further modification of the invention, the two oscillators *3a* and *3b* oscillate at different frequencies $f_1$ and $f_2$. The voltages from the two oscillators are sent through the same path to a single alternating signal amplifier 8 and passed through filter circuits 9 and 10, each tuned to pass a respective one of the oscillator frequencies and to reject the other. The filtered signals are then detected in the respective circuits 11 and 12 and applied to the load circuit 2. The use of a common amplifier 8 provides equal amplification of the signals of frequency $f_1$ and $f_2$.

In a preferred embodiment (see Fig. 4) the oscillator *3a* or *3b* comprises a feedback oscillator 13 consisting of an amplifier 14 whose control voltage is the direct voltage to be amplified, this amplifier being followed by one of several amplifiers 15. The amplitude and phase of the feedback voltage available over leads 16 are so chosen that they produce oscillations. The circuit of Fig. 4 is biased to be on the verge of oscillation and to oscillate only when a direct signal is received from source 1. This arrangement permits an increased amplification in an open loop of the oscillator and reduces its response threshold.

Fig. 5 illustrates an embodiment of the invention employing a feedback oscillator arrangement. The control voltage, depending upon its polarity, is applied to one of the two amplifiers 17 or 18, whose outputs are connected to a single amplifier 19. Feedback connections 20 are provided as previously described. The amplifiers, 17 and 19 on the one hand, 18 and 19 on the other hand, form feedback oscillators tuned to the frequencies $f_1$ and $f_2$. The two voltages of the frequencies $f_1$ and $f_2$ are then amplified in the same A.-C. amplifier 21, are separated by filters at 9 and 10, and finally detected at 11 and 12 before being applied to load circuit 1 as previously described. Where the two voltages of the frequency $f_1$ and $f_2$ have a sufficiently large amplitude, the amplifier 18 may be omitted.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a source of positive and negative polarity signals, a first and a second alternating signal source, means for controlling the amplitude of alternating signals available from said one source in accordance with the positive polarity portion of said first-mentioned signals, means for controlling the amplitude of the alternating signals available from said second source in accordance with the amplitude of the negative polarity portion of said first-mentioned signals, means for amplifying said controlled amplitude alternating signals, means for detecting said amplified controlled alternating signals to derive the amplitude modulation components of said controlled signals, and means for re-establishing said first-mentioned signals as to polarity but in amplified form comprising means for combining said derived components.

2. An arrangement according to claim 1 wherein the alternating signals from said sources are of a different frequency, and means for separating said amplified alternating signals of different frequency prior to detection.

3. An arrangement according to claim 1 wherein said alternating signal sources comprise feedback oscillators, means for adjusting the level of feedback of such oscillators such that said sources supply alternating signals only in response to a respective polarity signal from said first-mentioned source.

4. An arrangement for amplifying a signal having positive and negative polarity portions comprising means for providing at least a first frequency and a second frequency alternating signal, means for varying said first signal in accordance with the amplitude of said positive polarity signal portions, means for varying the amplitude of said second signal in accordance with the amplitude of said negative polarity signal portions, a common circuit for amplifying said amplitude varied first and second signals, means separating said amplified varied first and second signals, means for detecting said separated signals to derive separate detected outputs, and means for re-establishing said first-mentioned signal as to polarity but in amplified form comprising means for combining said separate detected outputs.

5. An arrangement according to claim 4 wherein said first-mentioned means further comprises means for providing at least a first frequency and a second frequency alternating signal only in response to receipt of a respective polarity signal.

6. An arrangement for amplifying a substantially low frequency signal having first and second wave shape portions varying with time respectively above and below a given reference level comprising means responsive only to the amplitude of said first portions for generating first high frequency signals of corresponding amplitude, means responsive only to the amplitude of said second portions for generating second high frequency signals of corresponding amplitude, a common circuit for amplifying said first and second signals, means for separately detecting said amplified first and second signals to derive the modulation components thereof, and means for recombining said separately detected signals in a predetermined manner related respectively to said portions of said low frequency signal.

7. An arrangement for processing signals having a positive and a negative polarity portion with respect to a given reference level comprising a source of first and second subcarrier waves of different frequency, means for modulating said first waves with said positive polarity portions to derive first modulated waves, means for modulating said second waves with said negative polarity portions to derive second modulated waves, a common transmission channel for transmitting said first and second waves simultaneously, means for separating said transmitted first and second modulated waves, means for detecting said separated transmitted modulated waves to derive separately detected waves, and means for recombining said separately detected waves to provide said first mentioned signals with positive and negative polarity portions but modified in accordance with the transmission through said common channel.

8. An arrangement for processing signals having a positive and a negative polarity portion with respect to a given reference level comprising a source of first and second subcarrier waves of different frequency, means for amplitude modulating said first waves with said positive polarity portions to derive first modulated waves, means for amplitude modulating said second waves with said negative polarity portions to derive second modulated waves, a common transmission channel for transmitting said first and second waves, means for separating said transmitted first and second modulated waves, means for amplitude detecting said separated transmitted modulated waves to derive the amplitude modulation components thereof, and means for recombining said amplitude modulation components to re-establish said first mentioned signals as to polarity but modified in accordance with the transmission through said common channel.

References Cited in the file of this patent

UNITED STATES PATENTS

| | | |
|---|---|---|
| 2,175,270 | Koch | Oct. 10, 1939 |
| 2,379,513 | Fisher | July 3, 1945 |
| 2,453,454 | Norwine | Nov. 9, 1948 |
| 2,700,149 | Stone | Jan. 18, 1955 |
| 2,820,895 | Johnstone | Jan. 21, 1958 |

FOREIGN PATENTS

| | | |
|---|---|---|
| 657,690 | Great Britain | Sept. 26, 1951 |